(12) United States Patent
Chuang et al.

(10) Patent No.: US 8,376,317 B2
(45) Date of Patent: Feb. 19, 2013

(54) MICROFLUIDIC PURGE VALVE

(75) Inventors: Han-Sheng Chuang, Taipei (TW); Steven T. Wereley, W. Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 206 days.

(21) Appl. No.: 13/074,699

(22) Filed: Mar. 29, 2011

(65) Prior Publication Data

US 2011/0233446 A1 Sep. 29, 2011

Related U.S. Application Data

(60) Provisional application No. 61/318,411, filed on Mar. 29, 2010.

(51) Int. Cl.
*F16K 1/00* (2006.01)

(52) U.S. Cl. .................. 251/331; 251/129.01; 422/502

(58) Field of Classification Search .................. 251/11, 251/129.01, 331; 422/502
See application file for complete search history.

(56) References Cited

U.S. PATENT DOCUMENTS

| | | | |
|---|---|---|---|
| 8,075,852 B2 * | 12/2011 | Gao et al. | 422/502 |
| 2012/0101268 A1 * | 4/2012 | Elizarov et al. | 536/25.32 |
| 2012/0136492 A1 * | 5/2012 | Amin et al. | 700/285 |

* cited by examiner

*Primary Examiner* — Eric Keasel
*Assistant Examiner* — Ian Paquette
(74) *Attorney, Agent, or Firm* — Maginot, Moore & Beck, LLP

(57) ABSTRACT

A microfluidic purge valve in a microfluidics system includes a notch defined in the valve seat of a microfluidic valve. The notch is sized so that gas entrained within a liquid pumped through the microfluidics system can pass freely therethrough but the liquid cannot. The notch is sized so that the resistant force generated by the surface tension of the liquid is equal to or greater than the force generated by the fluid pressure.

6 Claims, 4 Drawing Sheets

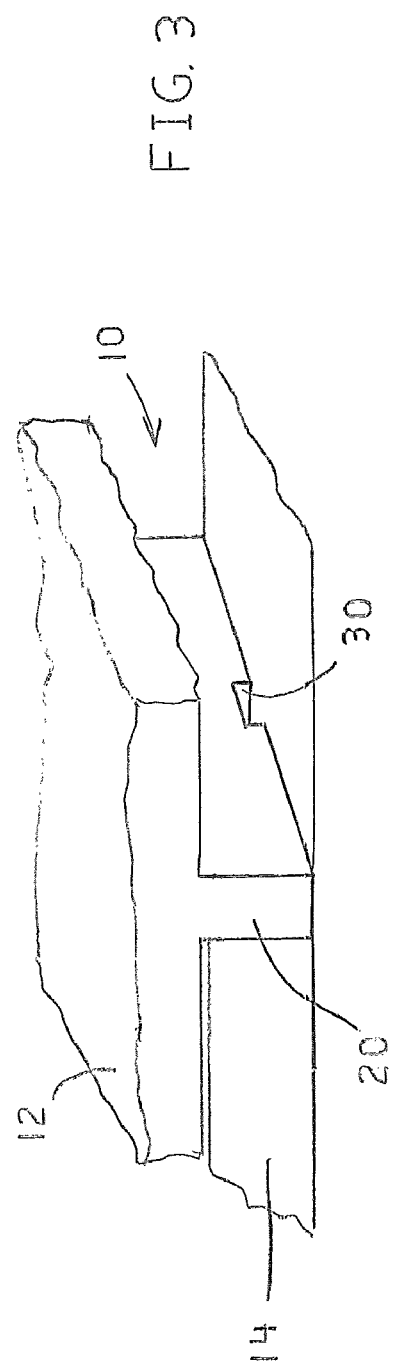
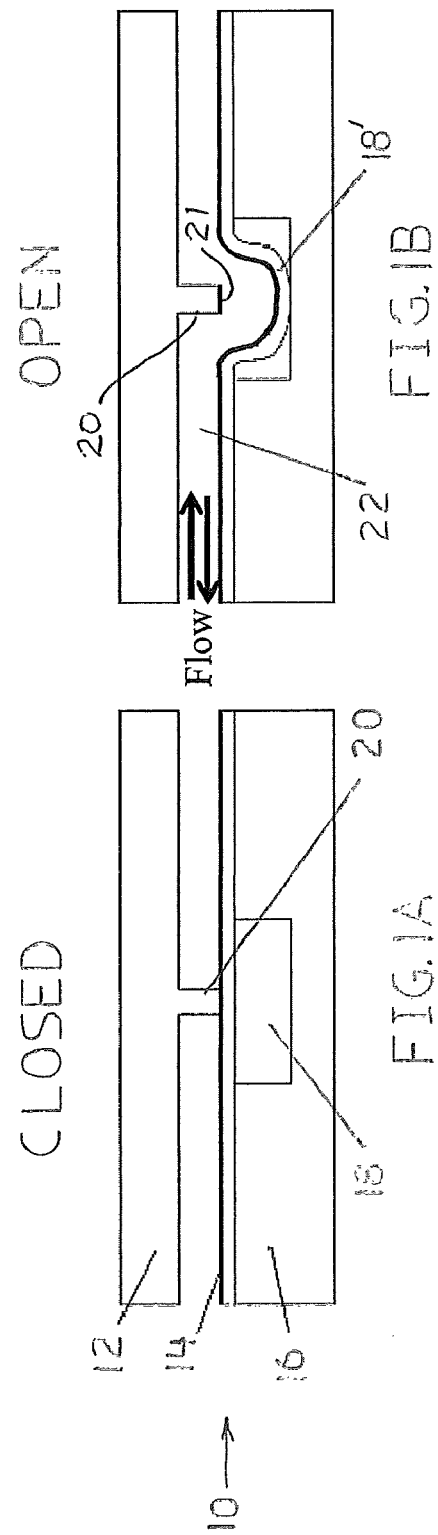

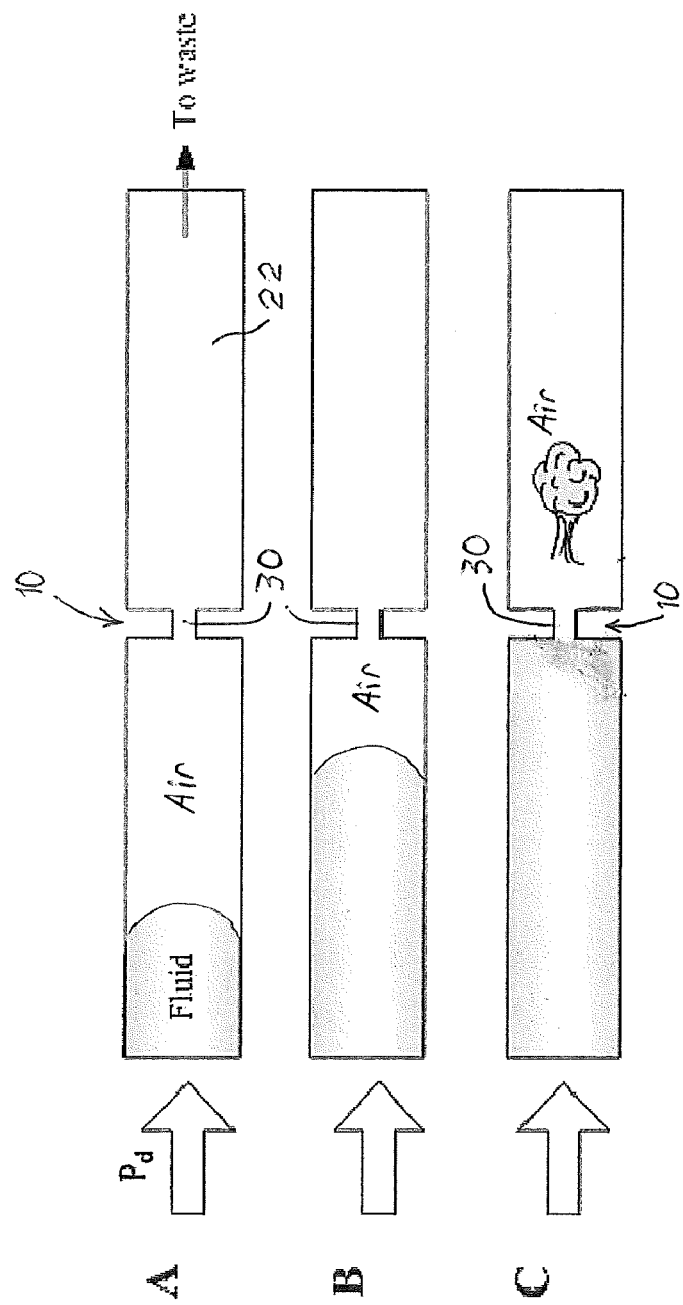
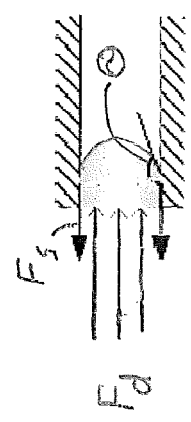

MICROFLUIDIC PURGE VALVE

CROSS-REFERENCE TO RELATED APPLICATIONS

This application is a non-provisional application claiming priority to provisional application No. 61/318,411, filed on Mar. 29, 2010, in the name of the present inventors, the entire disclosure of which is incorporated herein by reference.

STATEMENT REGARDING FEDERALLY SPONSORED RESEARCH

This invention was made with government support under CCF-0726821 awarded by National Science Foundation. The government has certain rights in the invention.

TECHNICAL FIELD

The present disclosure generally relates to microfluidics and particularly to apparatus for purging air out of fluids in microfluidic systems.

BACKGROUND

Progressive miniaturization of chemical and biological instrumentation over recent years has spawned a new generation of systems for testing fluids. These new systems, known as microfluidic systems, are greatly simplifying and economizing chemical and biological testing. This miniaturization has led to the development of the "lab-on-a-chip" that is highly conducive to automated mass production at very low costs, much like an electrical integrated circuit chip. The size of the lab-on-a-chip also opens up new applications that were either unavailable or too unwieldy to implement with typical laboratory equipment.

The driving force behind this revolution is the microfluidics. A basic building block of a microfluidics system is the fluid valve, such as the valve 10 depicted in FIG. 1. In one embodiment the valve is made a three-layer structure, which includes a fluid layer 12, a membrane 14, and a gas layer 16. When the valve is in a closed state shown in FIG. 1A, pressurized gas is vented to a gas channel 18 and which pushes the membrane 14 against the seat surface 21 of a valve seat 20 on the fluid layer 12. When the valve is in an open state the membrane 18' is pulled down by a vacuum applied in the gas channel 18 so that the seat surface 21 is clear of the membrane, as shown in FIG. 1B. Thus, in the open state the membrane 14' is retracted from the valve seat 20 permitting fluid to flow through the fluid microchannel 22.

In certain microfluidic applications multiple fluids are mixed, such as in the exemplary system depicted in FIG. 2. The system includes a number of valves V1-V9 that control the flow of the fluids, in this case Fluid A and Fluid B. Pumps P1 and P2 are provided to draw the fluids from their respective reservoirs and propel them through the Mixer. In a typical microfluidic system the pumps are peristaltic pumps. The valves and pumps are controlled in a particular sequence to introduce quantities, or "slugs" Slug A and Slug B, of the different fluids to the Mixer. With the fluids in the Mixer, the valves V5 and V9 are closed and the fluids are continuously looped by the pump P2 until they are appropriately mixed. At that point, the valve V8 is closed and V9 opened to discharge the mixed fluids.

However, one problem that arises is that air bubbles become trapped in micro-volumes of fluids. The air bubbles can be particularly disruptive when fluids are mixed, as in the system shown in FIG. 2. In some cases, mixing efficiency can be greatly diminished or even prevented. Where the air bubbles are particularly large the pump P2 may not function properly so that the fluid micro-volumes stall within the Mixer.

Due to the insidious nature of trapped air bubbles in microfluidic applications, purge valves have been developed. One such purge valve devices is a latch valve developed by Urbanski et al. See J. P. Urbanski, W. Thies, C. Rhodes, S. Amarasinghe, and T. Thorsen; "Digital Microfluidics Using Soft Lithography", Lab Chip 6: 96-104 (2006). This latch-type purge valve relies upon partially deflecting the valve membrane, such as membrane 14 shown in FIG. 1A, to block the flow of an emulsified aqueous sample, for instance, while allowing the immiscible oil phase to pass. Surface tension of the fluid slug prevents its passage through the reduced valve opening. However, this type of valve requires more complex operations and fabrication limitations, which make it hard to prevail in the microfluidic applications. For instance, the purge latch is actuated by a pressure source independent from the control lines used to control the closed-open state of the valve. Alternatively, use of a common pressure source requires more sophisticated control of the gas pressure provided in the gas line 18.

Moreover, this type of purge valve device is limited to pressure-operated valves. For instance, the partially deflecting or partially opening attribute cannot be readily replicated in an electrostatic valve. In an electrostatically actuated device there is no intermediate stage of attraction between the electrodes—there is only on and off.

There remains a need for a microfluidic system with the capability of purging air bubbles within a micro-volume of fluid that is low-cost, simple to operate, and easy to fabricate. There is also a need for a purging system that can be used universally with all microfluidic components.

SUMMARY

A microfluidic purge valve is disclosed that is configured to be disposed within a microchannel configured for the passage of one or more liquids therethrough under pressure, in which the microvalve has an open condition for permitting liquid flow and a closed condition for preventing liquid flow. The microvalve includes a valve seat sized to prevent liquid flow through the microchannel when a seat surface of the valve seat sealingly engages another surface. In one embodiment, the microvalve includes a membrane that seals against the valve seat surface when the microfluidic valve is closed and is drawn away from the valve seat when the valve is open.

In one feature, a purge notch is defined through said valve seat. The purge notch is sized such that air or gas entrained within the liquid passes through said notch under the pressure. The notch is further sized such that surface tension force acting on the liquid within the notch is equal to or greater than the force acting on the liquid as a result of the pressure, whereby the liquid is prevented from passing through the notch. In one aspect, the purge notch has a height h and a width w that are determined in relation to the pressure $P_d$ applied to the liquid, according to the following equation:

$$P_d = \frac{2(h+w)\sigma\cos(\pi-\theta)}{hw},$$

where $\sigma$ is the surface tension of the liquid and $\theta$ is the contact angle for the surface of said purge notch.

The purge notch may be a linear channel defined through the valve seat, or may be non-linear to increase the gas flow path. The notch may be tapered to provide a surface tension resistant force gradient. Multiple notches may be defined in the valve seat to increase gas flow.

BRIEF DESCRIPTION OF DRAWINGS

The foregoing aspects and other features of the present disclosure are explained in the following description, taken in connection with the accompanying drawings.

FIGS. 1A, 1B are schematic views showing the basic operations for a microfluidic valve.

FIG. 3 is an enlarged perspective view of a microfluidic valve incorporating a purge notch as disclosed herein;

FIG. 4 is an enlarged cross-sectional representation of a fluid front in a microchannel depicting the pressure and resistant forces acting on the liquid.

FIG. 5 is a schematic representation of a fluid front and gas bubble advancing through a purge notch as disclosed herein.

DETAILED DESCRIPTION

A purge valve is provided to purge air bubbles or gas in a fluid channel of a microfluidics system. The microfluidic purge valve disclosed herein has low technical requirements and does not interfere with the other structures on a microfluidic chips.

Figure 2:
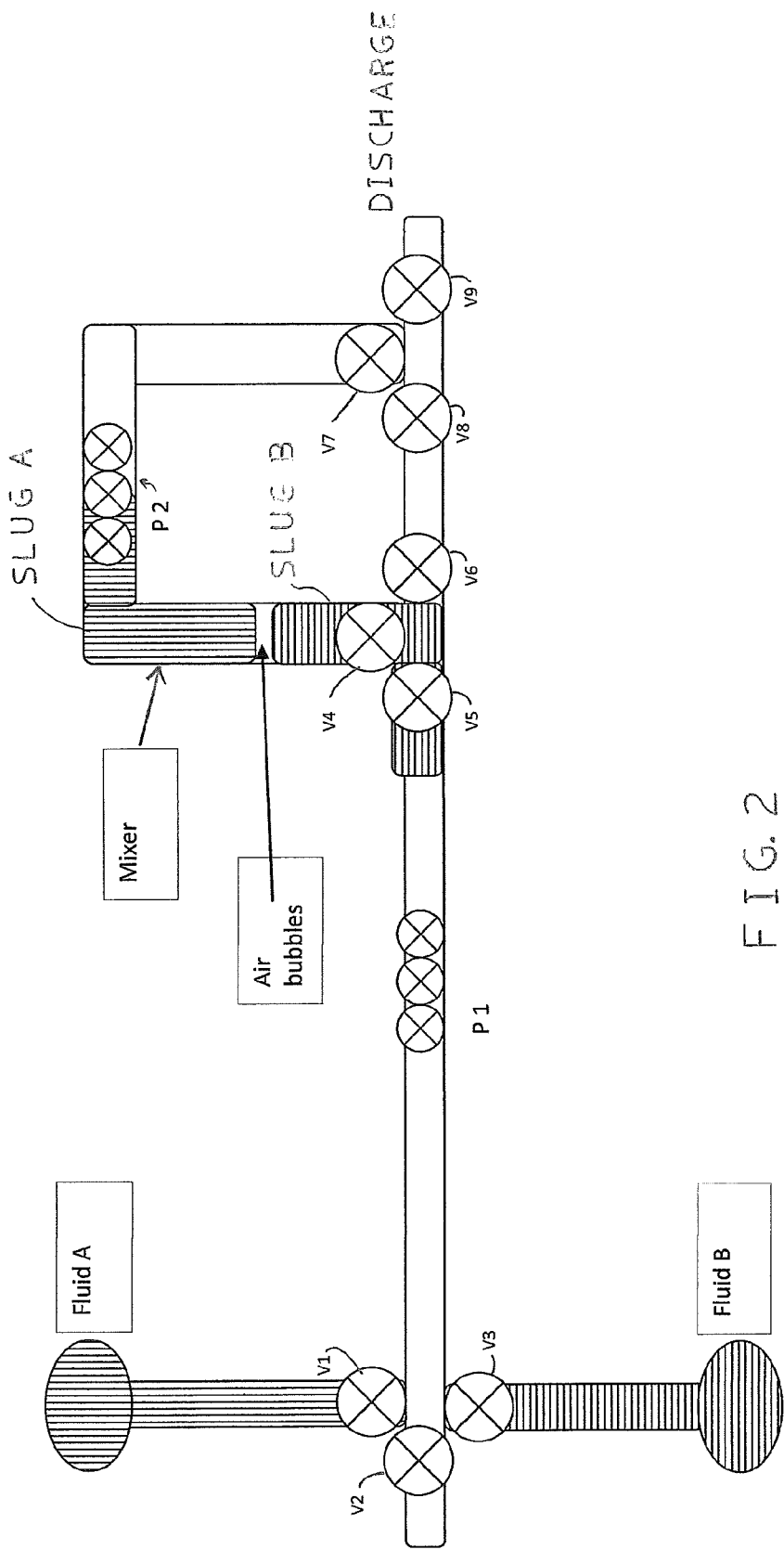
FIG. 2 is a schematic of one form of microfluidic mixing system.

In a microfluidics system, such as the system depicted in FIG. 2, the object is to purge the undesirable air bubble or gas while retaining the desirable fluids within the microchannels of the system. In particular, referring to the microfluidic valve 10 show in FIG. 1A, the closed state of the valve must not be compromised while allowing the air bubble to percolate out of the desirable fluids. To this end, a purge notch 30 is defined in the valve seat 20 of the microfluidic valve 10 as shown in FIG. 3. The notch 30 thus defines an open passageway across the valve seat that communicates with the microchannel 22.

Since the notch is always "open", even when the membrane 14 bears against the valve seat 20 in the closed position (see FIG. 1A), the notch must be sized to prevent flow of the desired fluid therethrough. To determine the proper size of a notch to retain the fluid, the resistant force ($F_s$) due to surface tension in the fluid must be greater than or equal to the applied pneumatic force ($P_d$) generated by the microfluidics pump, such as pump P1 or P2 in FIG. 2. The static relationship between the surface tension force $F_s$ and the pneumatic force $P_d$ is depicted in FIG. 4 and is developed from the following equations:

$$P_d A = F_s$$

$$P_d A = 2(h+w)\sigma\cos(\pi - \theta)$$

$$P_d hw = 2(h+w)\sigma\cos(\pi - \theta)$$

$$P_d = \frac{2(h+w)\sigma\cos(\pi - \theta)}{hw}$$

where $\theta$ is the contact angle of the liquid on a valve surface, $\sigma$ is the surface tension of the liquid, $P_d$ is the applied pressure, A is the cross sectional area of the notch, and h and w are the height and width of the notch, respectively. As is common in microfluidic systems, the valve elements are formed of PDMS (polydimethylsiloxane), which is hydrophobic having a contact angle $\theta$ of about 100°. Following is a table of values for exemplary embodiments for a fluid having a surface tension $\sigma$ of 0.073 N/m:

| h (μm) | w (μm) | Pd (Pa) |
|---|---|---|
| 50 | 25 | 1521.1 |
| 50 | 50 | 1014.11 |
| 50 | 75 | 845.09 |

Assuming the maximum pressure that the pump can generate is 1000 Pa, a notch of less than 50 μm in width will be sufficient to retain the fluid but still allow the air bubbles or gas to pass through. It can be appreciated a valve surface having a different contact angle, or a fluid having a different surface tension, will yield a different pump pressure for the notch dimensions shown above. It can also be appreciated that the equations above can be used to determine the notch dimensions given a particular pump pressure.

A general schematic of the operation of the purge valve is shown in FIGS. 5A-B. In FIG. 5A, a slug of fluid is shown with an air bubble between the slug and the valve 10. It can be appreciated that although the valve seat and membrane are not specifically depicted in these figures, the valve is in its closed position, as illustrated in FIG. 1A. As pump pressure $P_d$ is applied, the slug advances towards the valve, pushing the air bubble in front of it so that the bubble traverses the purge notch 30, as depicted in FIG. 5B. When the fluid slug reaches the valve 10, the force $F_s$ induced by the surface tension in the slug counteracts the driving pressure $P_d$ and thus prevents passage of the slug through the notch 30, as shown in FIG. 5C.

The depiction in FIG. 5C can be used to illustrate another attribute of the purge valve disclosed herein. If the surface tension, or more specifically the resistant force $F_s$ is insufficient to keep the liquid from escaping through the notch 30, the small dimensions of the notch will cause a significant pressure drop (according to Poiseuille's equation), which will slow down the liquid as it passes through the notch (once the air has passed through the notch). Put another way, the dimensions of the purge notch 30 may be calibrated to permit a very low flow or seeping of the liquid through the notch while the valve 10 is closed. Thus, using one of the examples above, a notch having a height of 50 μm and a width of 25 μm is suitable to stop the subject liquid at a pump pressure of 1521.1 Pa. However, if the pump pressure is greater than 1520.1 Pa the fluid pressure $F_d$ will exceed the resistant pressure $F_s$ and the liquid will flow slowly through the notch. Similarly, if the pump pressure is 1521.1 Pa, a 50 μm wide notch having a width greater than 25 μm will also permit slow fluid flow, even when the valve is closed. The above two modes of operation may referred to as a stop sign (no flow) and a yield sign (slow flow).

Since the notch 30 is designed symmetrically across the valve seat 20, there is no limitation of direction for the operation. In other words, the liquid and air/gas may flow in either direction through the notch. Consequently, during a purge cycle the microfluidics chip may be configured to control the opening and closing of upstream and downstream valves. For example, in the microfluidic mixer illustrated FIG. 2, the valve V9 may incorporate the purge notch 30. As the mixer cycles the two slugs the air bubble will advance to the valve V9, at which point the valves V7, V8 may be closed to prevent any backflow.

The purge valve disclosed herein may take on different configurations and arrangements. In the embodiment shown in FIG. 3, the purge notch 30 is disposed in a microfluidic valve 10 within the liquid flow path through the microchannel 22. Alternatively, a purge notch 32 may be separate from the valve to bleed the air/gas directly to a vent 33, as illustrated schematically in FIG. 6A. The purge notch may be arranged upstream of the valve 10 to purge any gas from the liquid as it prior to reaching the valve.

Figure 6:
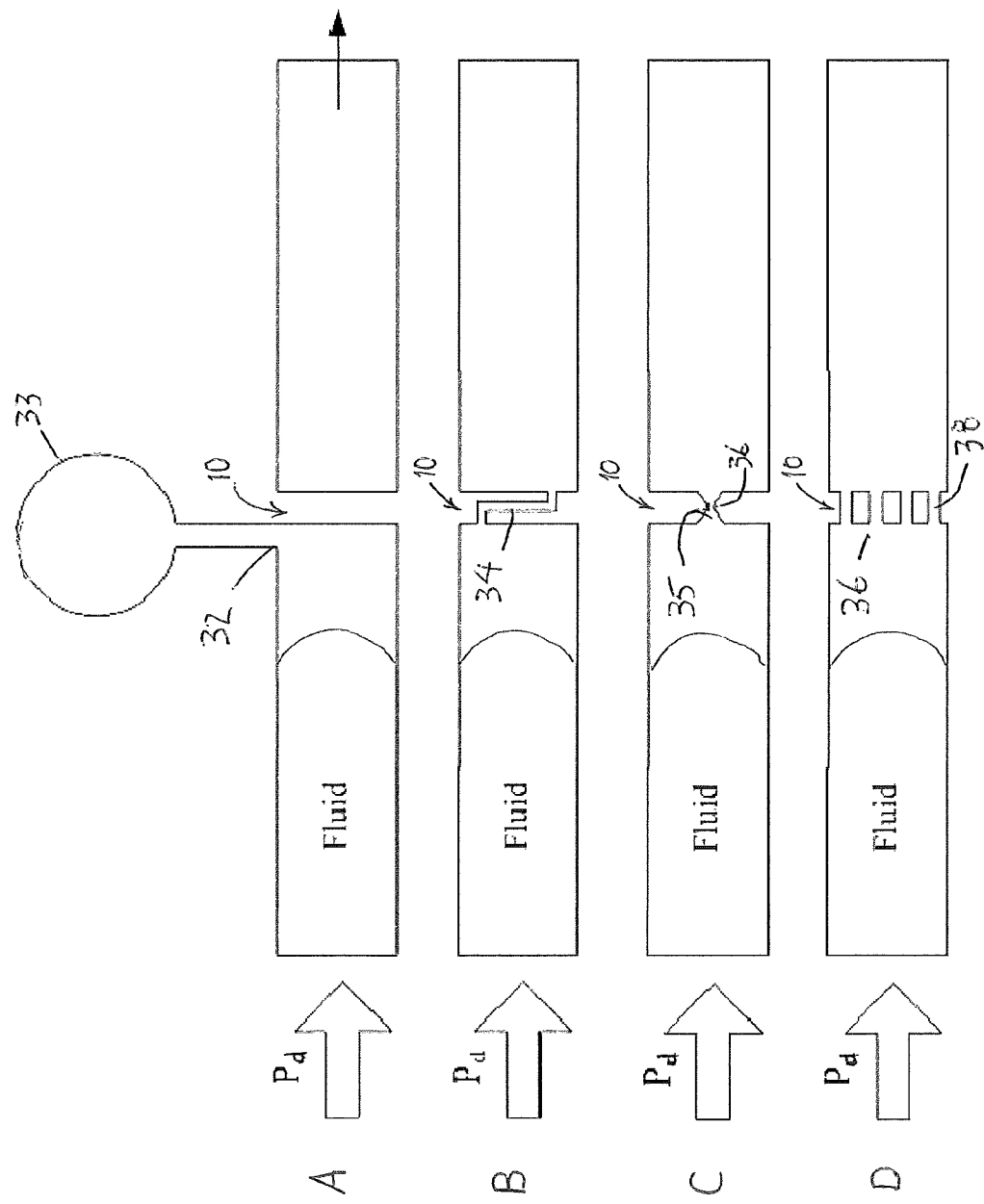
FIGS. 6A-d are alternative embodiments of a purge notch described herein.

In another embodiment, shown in the schematic of FIG. 6B, the notch 34 is extended to increase the resistance force. The dimensions of the notch may be sized in the manner described above but in this embodiment a circuitous path is formed in the valve seat, rather than a single linear channel. The purge notch 35 shown in FIG. 6C is tapered to define a gradient level of surface tension resistant force. In this embodiment, the necked down region 36 may have the same dimensions as the linear counterpart of FIG. 3. The notch may flare outward on both sides of the valve seat, or on the inlet side only. The purge notch arrangement 37 of FIG. 6D incorporates several similarly sized notches 38. These multiple gas passages may connect to a single microchannel, as shown in the figure, or to multiple microchannels. The purge notch arrangement 37 allows more gas flux, hence reducing the purging time.

The purge notch according to the present disclosure may be configured to work within hydrophobic or hydrophilic channels. It is understood that the contact angle θ in the above sizing equations will vary from the 100° value used in the examples. In the case of a hydrophobic surface, the liquid is prevented from entering the purge notch 30. In the case of a hydrophilic surface, the liquid may enter the notch but the liquid flow slows significantly before exiting the notch.

The purge valve disclosed herein is similar to a conventional valve, which allows fluid flowing in an open state and stops fluid in a closed state. Unlike prior purge systems, no modification of the pressure protocol for the microvalve gas channel is required. Moreover, the purge notch 30 does not require any additional structure to be added to the microfluidics or lab-on-a-chip system, where space considerations are critical. Instead, the purge notch disclosed herein involves a slight modification to the valve seat of any valve in the system. In the illustrated embodiments, the purge notch is defined in the contact edge of the valve seat 20, to simplify production. However, the notch may be in the form of an equivalently sized opening through the valve seat. It can be noted that the notch does not require a liquid impermeable and gas permeable membrane, but instead utilizes the surface tension of the liquid itself.

It is further contemplated that the principles of the purge notch disclosed herein may be incorporated into other microvalve configurations, including microvalves that do not utilize pressurized gas to control a valve membrane. Suitable microvalves include a valve seat having a seat surface that may be sealed against another surface to prevent fluid flow. The valve seat may be stationary, as in the examples shown herein, or may move to engage a sealing surface.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A microfluidic purge valve disposed within a microchannel configured for the passage of one or more liquids therethrough under pressure, said valve comprising:
   a microvalve disposed within said microchannel for permitting liquid flow in an open condition and preventing liquid flow in a closed condition, said microvalve including a valve seat sized to prevent liquid flow through the microchannel; and
   a purge notch defined through said valve seat, said purge notch sized such that air or gas entrained within the liquid passes through said notch under the pressure, and such that surface tension force acting on the liquid within said notch is equal to or greater than the force acting on the liquid as a result of the pressure, whereby the liquid is prevented from passing through said notch.

2. The microfluidic purge valve of claim 1, wherein said purge notch has a height h and a width w that are determined in relation to the pressure $P_d$ applied to the liquid, according to the following equation:

$$P_d = \frac{2(h+w)\sigma\cos(\pi - \theta)}{hw},$$

where σ is the surface tension of the liquid and θ is the contact angle for the surface of said purge notch.

3. The microfluidic purge valve of claim 1, wherein said notch is a linear channel.

4. The microfluidic purge valve of claim 1, wherein said notch is a non-linear channel.

5. The microfluidic purge valve of claim 1, wherein said valve seat includes a plurality of said notches.

6. The microfluidic purge valve of claim 1, wherein said notch includes a tapered surface.

* * * * *